(12) United States Patent
Sato

(10) Patent No.: US 6,975,772 B2
(45) Date of Patent: Dec. 13, 2005

(54) IMAGE PROCESSING APPARATUS WITH FREE ADDRESSING CONTROL

(75) Inventor: Yutaka Sato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 712 days.

(21) Appl. No.: 10/145,560

(22) Filed: May 13, 2002

(65) Prior Publication Data

US 2002/0172430 A1    Nov. 21, 2002

(30) Foreign Application Priority Data

May 16, 2001    (JP) .............................. 2001-146864

(51) Int. Cl.[7] .............................................. G06K 9/46
(52) U.S. Cl. ...................................... 382/240; 382/232
(58) Field of Search ................................ 382/240, 224, 382/305, 282, 299, 233; 875/240.24; 358/403; 707/3, 4, 6

(56) References Cited

U.S. PATENT DOCUMENTS

| | | | | |
|---|---|---|---|---|
| 5,936,673 A | * | 8/1999 | Agarwal | ................ 375/240.24 |
| 6,088,489 A | * | 7/2000 | Miyake | ........................ 382/299 |
| 6,097,842 A | * | 8/2000 | Suzuki et al. | ................ 382/232 |
| 6,246,797 B1 | * | 6/2001 | Castor et al. | ................ 382/232 |
| 6,545,687 B2 | * | 4/2003 | Scott et al. | .................. 345/629 |

FOREIGN PATENT DOCUMENTS

| | | | | |
|---|---|---|---|---|
| EP | 1005231 | * | 5/2000 | ............ H04N 7/26 |
| JP | 1070722 | | 3/1998 | ............ H04N 7/30 |

OTHER PUBLICATIONS

Jafarkhani et al. "A Scalable Wavelet image Coding Scheme Using Multi-Stage Prune Tree-Structure vector Quantization", IEEE, vol. 3, Oct. 1995, pps. 81-84.*

* cited by examiner

*Primary Examiner*—Anh Hong Do
(74) *Attorney, Agent, or Firm*—Cooper & Dunham LLP

(57) ABSTRACT

An image processing apparatus includes a wavelet transform unit which applies filtering to each of one or more images having a first size into which an original image is divided, thereby producing wavelet coefficients, a quantization unit which scans and quantizes the wavelet coefficients to produce quantization coefficients, and a coding unit which scans and encodes the quantization coefficients, wherein a number of pixels in one line for the filtering and a number of pixels in one line scanned for the quantization and the encoding are selectively changed, thereby encoding an image having a second size relatively small and of frequent use without division thereof into the one or more images having the first size.

9 Claims, 7 Drawing Sheets

IMAGE PROCESSING APPARATUS WITH FREE ADDRESSING CONTROL

BACKGROUND OF THE INVENTION

1. Field of the Invention

The present invention generally relates to image processing apparatuses such as image coding/decoding apparatuses, and particularly relates to an image processing apparatus such as an image coding/decoding apparatus used in a digital still camera, a digital video camera, or the like.

2. Description of the Related Art

In general, the coding of image data produces a code series by attending to orthogonal transform of image data from a special domain to a frequency domain and by carrying out quantization and entropy coding. In this process, an image region is generally divided into sub-regions each comprised of a plurality of pixels, followed by coding the obtained sub-regions. In JPEG, for example, an original image is divided into block areas each comprised of 8×8 pixels, and DCT is applied to each block area, followed by quantization and Huffman coding.

In the wavelet transform, which can generally produces images of higher quality than DCT, the size of an image is preferably $2^m \times 2^n$ (m, n: positive integer), as will be described later. The wavelet transform decomposes an image into lower frequency components and higher frequency components in the horizontal direction and in the vertical direction. The lower frequency components represent an image having an image resolution one octave lower than the original image. The image data having the lower resolution is subjected to further decomposition into frequency components in the horizontal direction and in the vertical direction. This procedure is repeated a predetermined number of times, and quantization and entropy coding are carried out with respect to each frequency component. If the original image is n-by-n pixels, an image having an image resolution three octaves lower than the original has a size that is n/8-by-n/8 pixels. In order to perform the wavelet transform for three octaves, the size of the original image should be a multiple of 8 by a multiple of 8. In practice, however, the image size is preferably $2^m \times 2^n$ (m, n: positive integer) so that the image can be further divided into those of lower resolution.

In terms of coding efficiency, it is preferable to perform the wavelet transform with respect to as big an image area as possible. Taking into account the cost of hardware implementation, however, an original image is generally divided into sub-regions of 256×256, 128×128, or 64×64, each of which is then subjected to wavelet transform.

In the system which performs orthogonal transform with respect to sub-regions into which an original image is divided, the size of the original image may not be a multiple of the size of a sub-region. In such a case, the original image is fitted into a wider area that is a multiple of a sub-region, and the wavelet transform is applied to the wider area by inserting padding data into blank areas around the original image. FIG. 1 is an illustrative drawing showing the way the padding data is inserted when the size of an original image is not a multiple of a sub-region. In FIG. 1, areas shown with hatches have padding data inserted therein. FIG. 2 is an illustrative drawing showing another example of padding data insertion. In this example, a sub-region to which the wavelet transform is applied is 128×128, and the original image that is to be coded has a size of 160×120. In the same manner as in FIG. 1, areas shown with hatches correspond to padding data areas. The size of 160×120 is typically used as a thumbnail image of a digital camera.

In the coding scheme that inserts padding data when the size of an original image is not a multiple of a sub-region, processing time will increase by an excess amount that is equal in amount to the padding data. If the coding applied is of an irreversible nature, the original image will be affected by padding data, causing a possible degradation of image quality after decoding. In terms of coding efficiency, it is desirable to apply transformation to as large an image area as possible. Since coding is performed on a sub-region-by-sub-region basis due to requirements for hardware implementation, however, image quality will be unduly degraded.

A system disclosed in Japanese Patent Laid-open Application No. 10-70722, image data of a desired size is obtained from original image data of any size by extending or interpolating the original image data, followed by wavelet transform for the coding purpose. In this scheme, however, processing for image extension or interpolation is complex, resulting in a complex hardware configuration and a cost increase.

Accordingly, there is a need for an image processing apparatus that can encode/decode image data of any size though a simple hardware configuration.

SUMMARY OF THE INVENTION

It is a general object of the present invention to provide an image processing apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an image processing apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an image processing apparatus according to the present invention includes a wavelet transform unit which applies filtering to each of one or more images having a first size into which an original image is divided, thereby producing wavelet coefficients, a quantization unit which scans and quantizes the wavelet coefficients to produce quantization coefficients, and a coding unit which scans and encodes the quantization coefficients, wherein a number of pixels in one line for the filtering and a number of pixels in one line scanned for the quantization and the encoding are selectively changed, thereby encoding an image having a second size relatively small and of frequent use without division thereof into the one or more images having the first size.

According to one aspect of the invention, the image processing apparatus as described above is such that the number of pixels in one line for the filtering and the number of pixels in one line scanned for the quantization and the encoding are changed so as to process an image having a third size whose horizontal and vertical lengths are a multiple of $2^n$ (n: positive integer) corresponding to a maximum level of a multi-resolution analysis of the wavelet transform, whereby divided portions of the original image having the first size and fully included in the original image are processed as the one or more images having the first size, and at least one remaining portion of the original image is processed as an image having the third size.

Further, an image processing apparatus according to the present invention includes an image memory of a first size, an address generation unit which receives information indicative of an image size, and generates addresses for accessing the image memory according to the information, and a transform unit which performs orthogonal transform on an image retrieved from the image memory at the addresses generated by the address generation unit, wherein the address generation unit generates addresses for accessing a memory area having the first size if the image memory stores therein an image having a first size, and generates addresses for accessing a memory area having a second size if the image memory stores therein an image having a second size.

In the invention described above, the image memory has a memory size sufficient for accommodating an image of a first size that is of frequent use, and the address generation unit is capable of free address control for accessing the memory, thereby efficiently processing an image of the first size without dividing the image into a second size. When an original image of a large size is divided into sub-regions having the second size, addressing is adopted to the second size so as to properly process the sub-regions. Further, the addressing for memory access can be freely controlled according to the information indicative of image size. When an original image of a large size is divided into sub-regions having the second size, leaving fractions of sub-regions as remaining regions of the original image, these remaining regions can be properly processed by supplying information indicative of the size of the remaining regions to the address generation unit. This makes it possible to perform orthogonal transform without inserting padding data, which improves the efficiency of orthogonal transform, and also makes it possible to avoid undue degradation of image quality in the case of an orthogonal transform that is of an irreversible nature.

Moreover, according to another aspect of the invention, a method of processing an image includes the steps of providing an address generation unit which receives information indicative of an image size, and generates addresses for accessing an image memory according to the information, dividing an original image into one or more sub-regions having a predetermined size and one or more remaining regions, supplying the one or more sub-regions having the predetermined size to the image memory, and supplying information indicative of the predetermined size to the address generation unit, retrieving image data from the image memory by using addresses generated by the address generation unit in such a manner as to match the predetermined size, followed by performing orthogonal transform on the retrieved image data, supplying the one or more remaining regions to the image memory, and supplying information indicative of size of the one or more remaining regions to the address generation unit, and retrieving image data from the image memory by using addresses generated by the address generation unit in such a manner as to match the size of the one or more remaining regions, followed by performing orthogonal transform on the retrieved image data.

In the invention described above, the orthogonal transform can be performed without inserting padding data, which improves the efficiency of orthogonal transform, and also makes it possible to avoid undue degradation of image quality in the case of an orthogonal transform that is of an irreversible nature.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
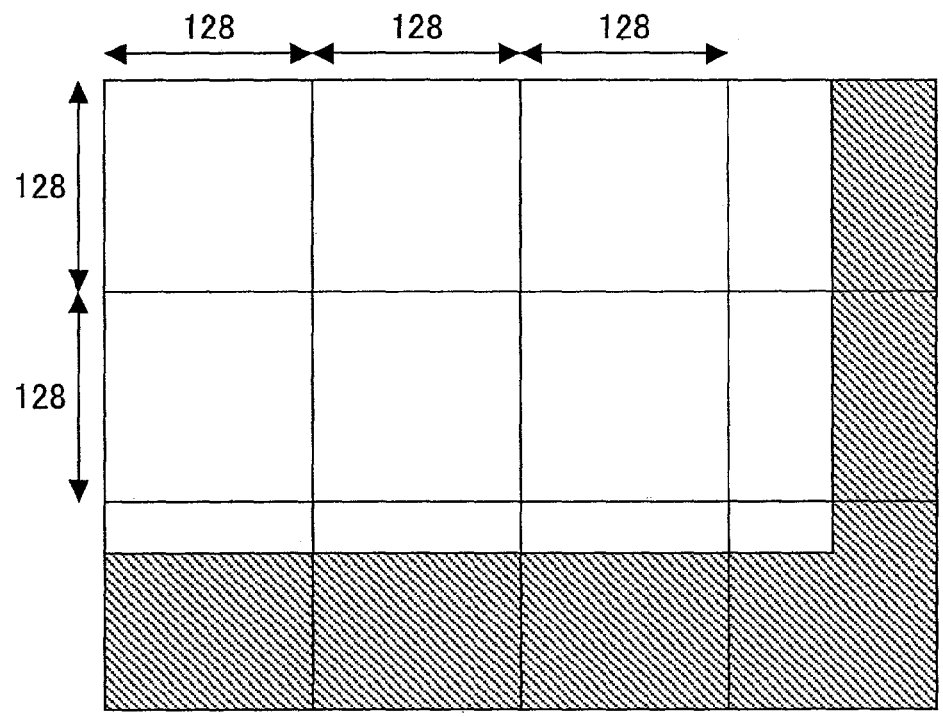
FIG. 1 is an illustrative drawing showing the way the padding data is inserted when the size of an original image is not a multiple of a sub-region.
Figure 2:
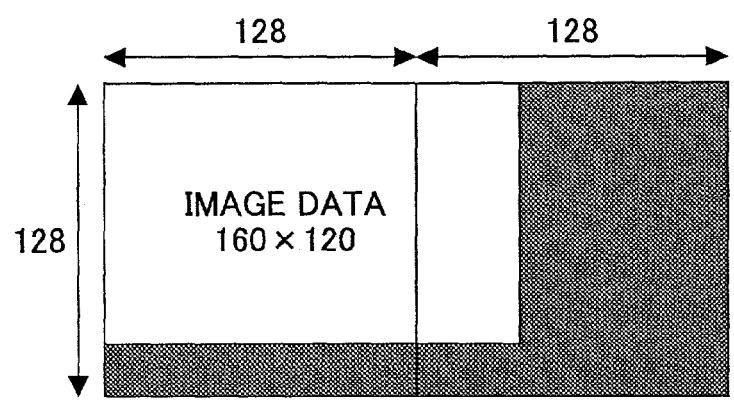
FIG. 2 is an illustrative drawing showing another example of padding data insertion.
Figure 3:
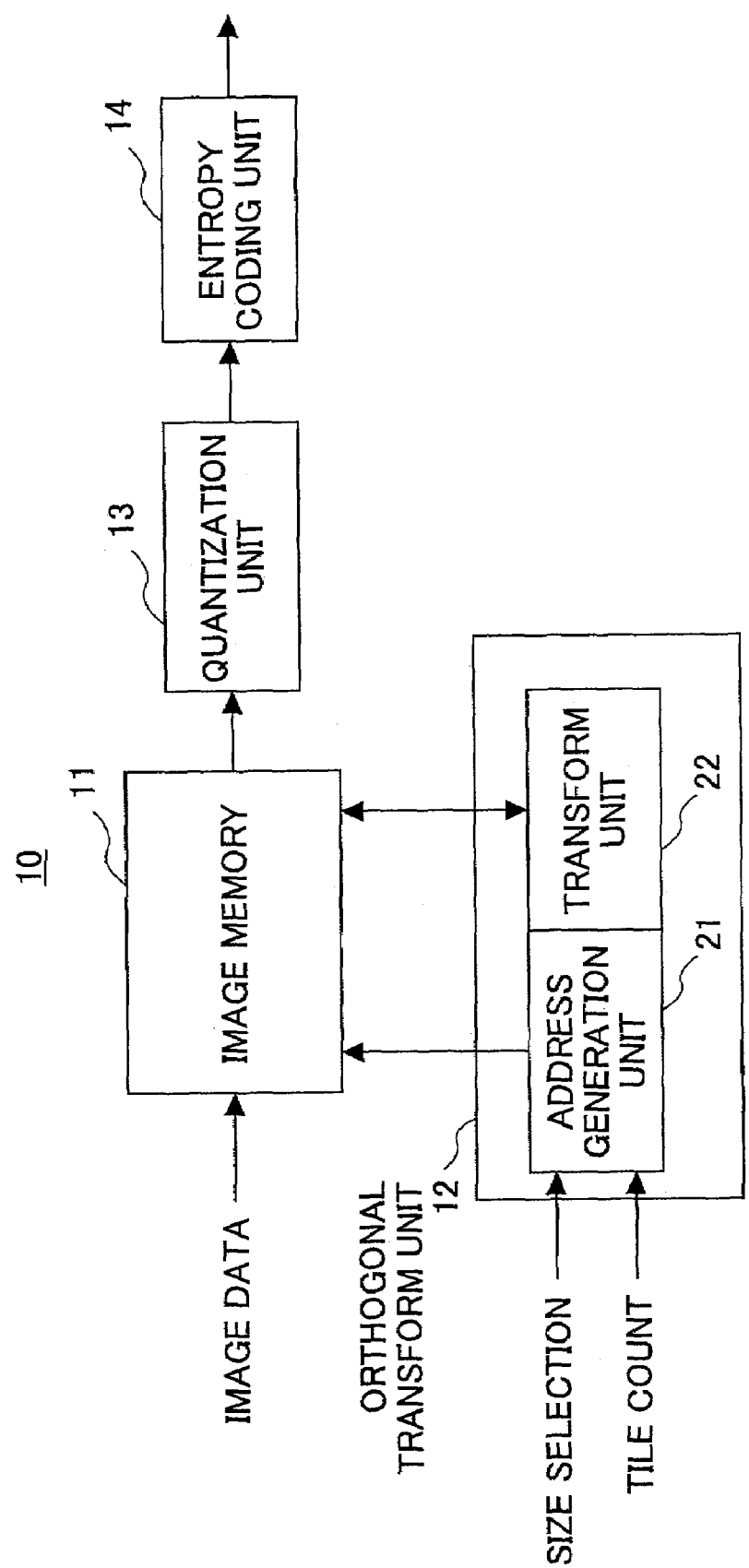
FIG. 3 is a block diagram of an image coding apparatus that is an image processing apparatus of the present invention.

FIG. 3 is a block diagram of an image coding apparatus that is an image processing apparatus of the present invention.

An image coding apparatus 10 of FIG. 3 includes an image memory 11, an orthogonal transform unit 12, a quantization unit 13, and an entropy coding unit 14. The orthogonal transform unit 12 includes an address generation unit 21 and a transform unit 22. The image memory 11 is configured to have a sufficient size for accommodating data of a particular image size. This particular image size may be that of a frequently used image such as a size of 160×120 that is often used as a thumbnail image in digital cameras. The address generation unit 21 receives a size selection signal and a tile count, and, in response, generates an address at which data is read from the image memory 11. Data is read from the image memory 11 at the read address generated by the address generation unit 21, and is then supplied to the transform unit 22. The transform unit 22 performs orthogonal transform such as the wavelet transform, and supplies the transformed data to the image memory 11. The quantization unit 13 quantizes the transformed data stored in the image memory 11, and supplies the quantized data to the entropy coding unit 14. The entropy coding unit 14 applies entropy coding to the supplied quantized data, thereby producing coded data.

The address generation unit 21 is configured to achieve free addressing control for accessing the image memory 11 based on the size selection signal and the tile count supplied thereto. When a 128-x-128 image is to be coded, for example, addressing is controlled so as to scan 128 pixels of the first line in the horizontal direction, followed by scanning 128 pixels of a next line in the horizontal direction, and such scan is repeated for 128 lines. When a 160-x-128 image is to be coded, addressing is controlled so as to scan 160 pixels of the first line in the horizontal direction, followed by scanning of 160 pixels of a next line in the horizontal direction, and such scan is repeated for 120 lines.

In the following, the operation of the orthogonal transform unit 12 will be described with reference to a case in which an image the size of 160×120 that is typical of a thumbnail image for digital cameras.

Figure 4:
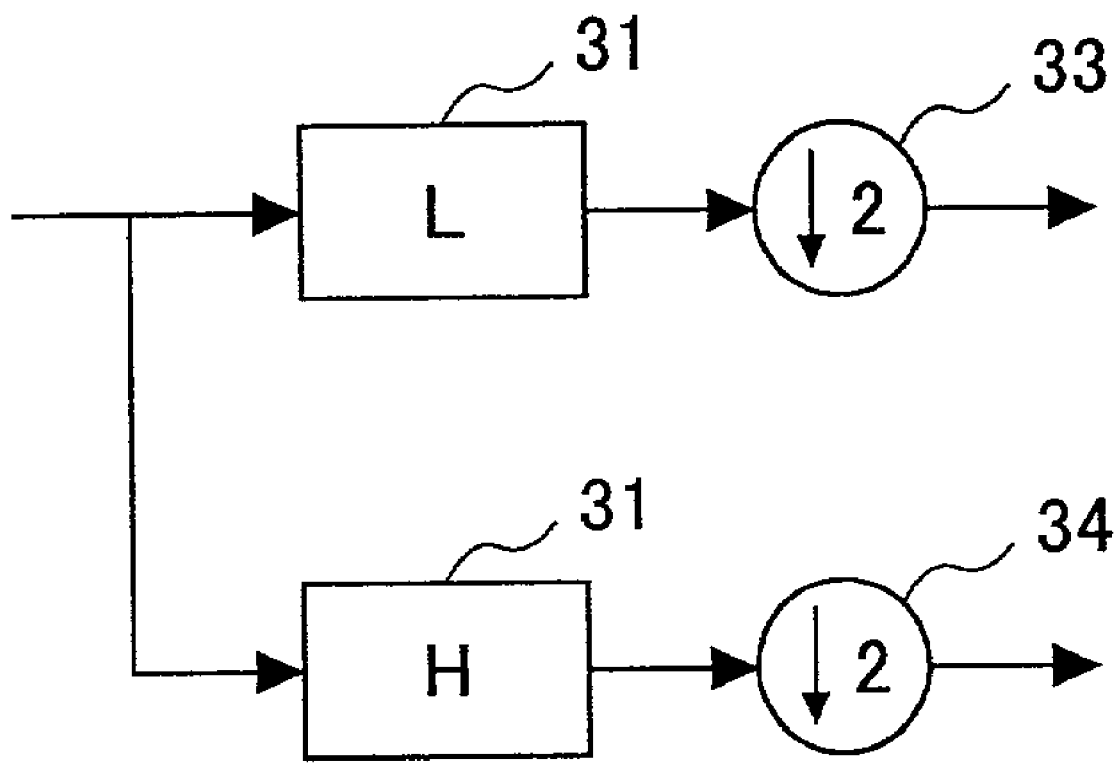
FIG. 4 is a block diagram showing a configuration of a transform unit.

FIG. 4 is a block diagram showing a configuration of the transform unit 22.

The transform unit 22 of FIG. 4 is designed to perform the wavelet transform, and includes a low-pass filter 31, a high-pass filter 32, and 1/2-down samplers 33 and 34. The low-pass filter 31 and the high-pass filter 32 apply low-pass filtering and high-pass filtering, respectively, to the supplied image data. The 1/2-down samplers 33 and 34 sub-sample the data output from the low-pass filter 31 and the high-pass filer 32, respectively, at half the sample rate. This decomposes the input image data into frequency components, so that lower frequency components are obtained by sub-sampling the output of the low-pass filter 31, and higher frequency components are obtained by sub-sampling the output of the high-pass filter 32.

The process described above is carried out in the vertical direction, for example, with respect to the 160-x-120 image stored in the image memory 11. Namely, the address generation unit 21 responds to a size selection signal indicative of an image size of 160×120 by generating successive addresses conforming to the 160-x-120 image size, thereby reading 120 pixels of a first line in the vertical direction. The pixel data retrieved is then subjected to transformation by the transform unit 22, thereby obtaining the data decomposed into lower frequency components and higher frequency components. The data decomposed into frequency components are stored in the image memory 11. The address generation unit 21 then proceeds to the next line to read 120 pixels in the vertical direction. The pixel data retrieved is then subjected to transformation by the transform unit 22, thereby obtaining the data decomposed into lower frequency components and higher frequency components, which are then stored in the image memory 11. This process is performed with respect to each of 160 lines of the image data, thereby generating 2-dimensional data that is decomposed into frequency components in the vertical direction.

The address generation unit 21 then generates successive addresses conforming to the image size of 160×120, so as to read 160 pixels of a first line in the horizontal direction with respect to the 2-dimensional data of decomposed frequency components. The transform unit 22 decomposes the retrieved pixel data into frequency components to produce data comprised of lower frequency components and higher frequency components. The data of decomposed frequency components is stored in the image memory 11. The address generation unit 21 then proceeds to the next line to read 160 pixels in the horizontal direction. The pixel data retrieved is then subjected to transformation by the transform unit 22, thereby obtaining the data decomposed into lower frequency components and higher frequency components, which are then stored in the image memory 11. This process is performed with respect to each of 120 lines of the image data, thereby generating 2-dimensional data that is decomposed into frequency components in the vertical direction and the horizontal direction.

When multi-resolution analysis is to be performed, further frequency decomposition in the vertical direction and horizontal direction is carried out by the address generation unit 21 and the transform unit 22 with respect to an image of lower vertical and horizontal frequency components. Here, the image of lower vertical and horizontal frequency components is an 80-x-60 low-resolution image that is part of the 2-dimensional data of decomposed vertical and horizontal frequency components, and is comprised of lower frequency components obtained by low-pass filtering in the horizontal direction the outputs of the low-pass filter serving in the vertical direction.

The procedure described above is repeated a predetermined number of times to produce the output of multi-resolution analysis. The output is then quantized by use of a predetermined step size, thereby producing quantization coefficients.

Figure 5:
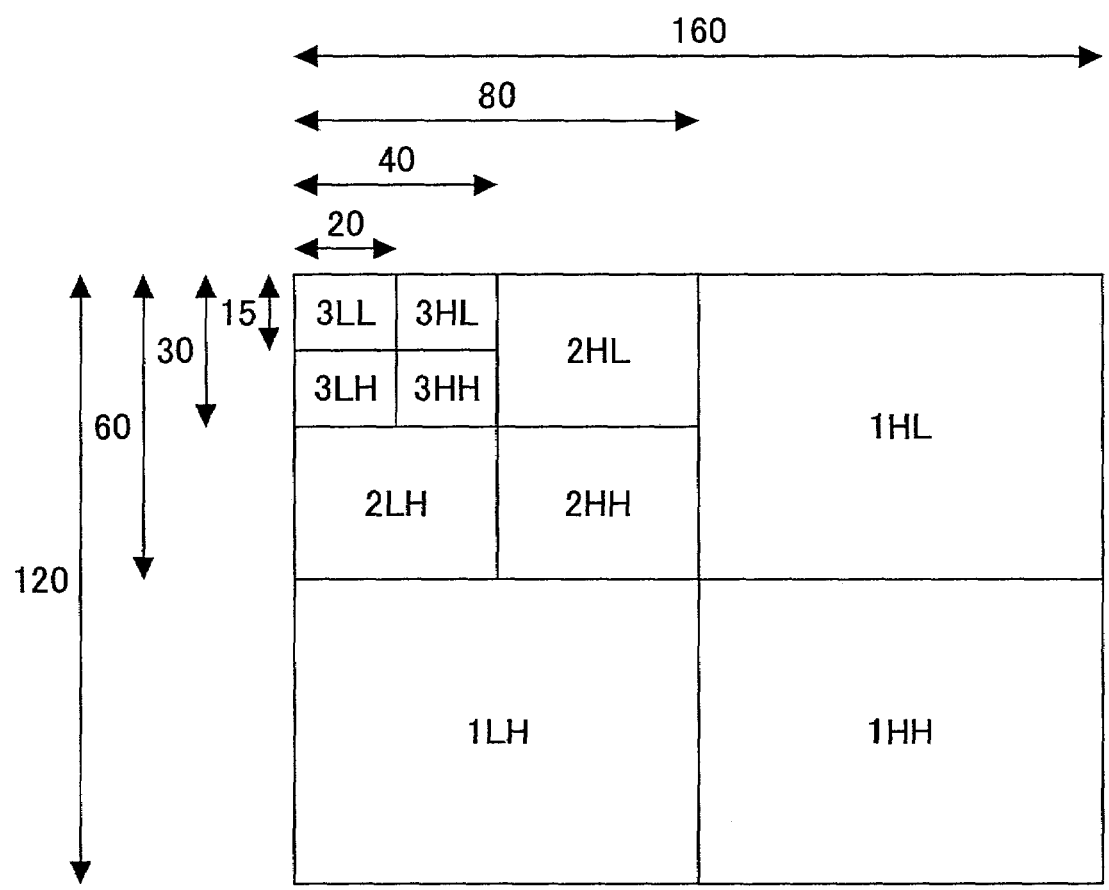
FIG. 5 is an illustrative drawing showing quantization coefficients obtained by three-octave multi-resolution analysis applied to a 160-x-120 image data.

FIG. 5 is an illustrative drawing showing quantization coefficients obtained by three-octave multi-resolution analysis applied to a 160-x-120 image data.

In FIG. 5, 1HL, 1LH, and 1HH are 2-dimensional data that were decomposed into frequency components once in the vertical direction and once in the horizontal direction, and correspond to higher horizontal and lower vertical frequency components, lower horizontal and higher vertical frequency components, and higher horizontal and higher vertical frequency components, respectively. Further, 2HL, 2LH, and 2HH are 2-dimensional data obtained by decomposing 1LL into frequency components in the vertical direction and the horizontal direction where 1LL is the lower horizontal and lower vertical frequency components of the 2-dimensional data that were decomposed into frequency components once in the vertical direction and once in the horizontal direction, and correspond to higher horizontal and lower vertical frequency components, lower horizontal and higher vertical frequency components, and higher horizontal and higher vertical frequency components, respectively. Further, 3LL, 3HL, 3LH, and 3HH are 2-dimensional data obtained by decomposing the 2-octove lower horizontal and lower vertical frequency components 2LL into frequency components in the vertical direction and the horizontal direction, and correspond to lower horizontal and lower vertical frequency components, higher horizontal and lower vertical frequency components, lower horizontal and higher vertical frequency components, and higher horizontal and higher vertical frequency components.

In this manner, image-data is decomposed into 10 sub-bands of frequency components. The sizes of these sub-bands are as follows, as shown in FIG. 5.

3LL, 3HL, 3LH, 3HH: 20×15
2HL, 2LH, and 2HH: 40×30
1HL, 1LH, and 1HH: 80×60

The quantization coefficients shown in FIG. 5 are encoded by the entropy coding unit 14 (FIG. 3).

In this manner, the image coding apparatus 10 can efficiently encode an image having a size of 160×120 that is typical of a thumbnail image used for digital cameras, without dividing the image into sub-images fitted into sub-regions each having a size of 128×128.

In what follows, the operation of the orthogonal transform unit 12 will be described in detail with reference to the coding of an image that is performed when an original image differing from a multiple of 128×128 is divided into sub-regions of varying sizes.

Figure 6:
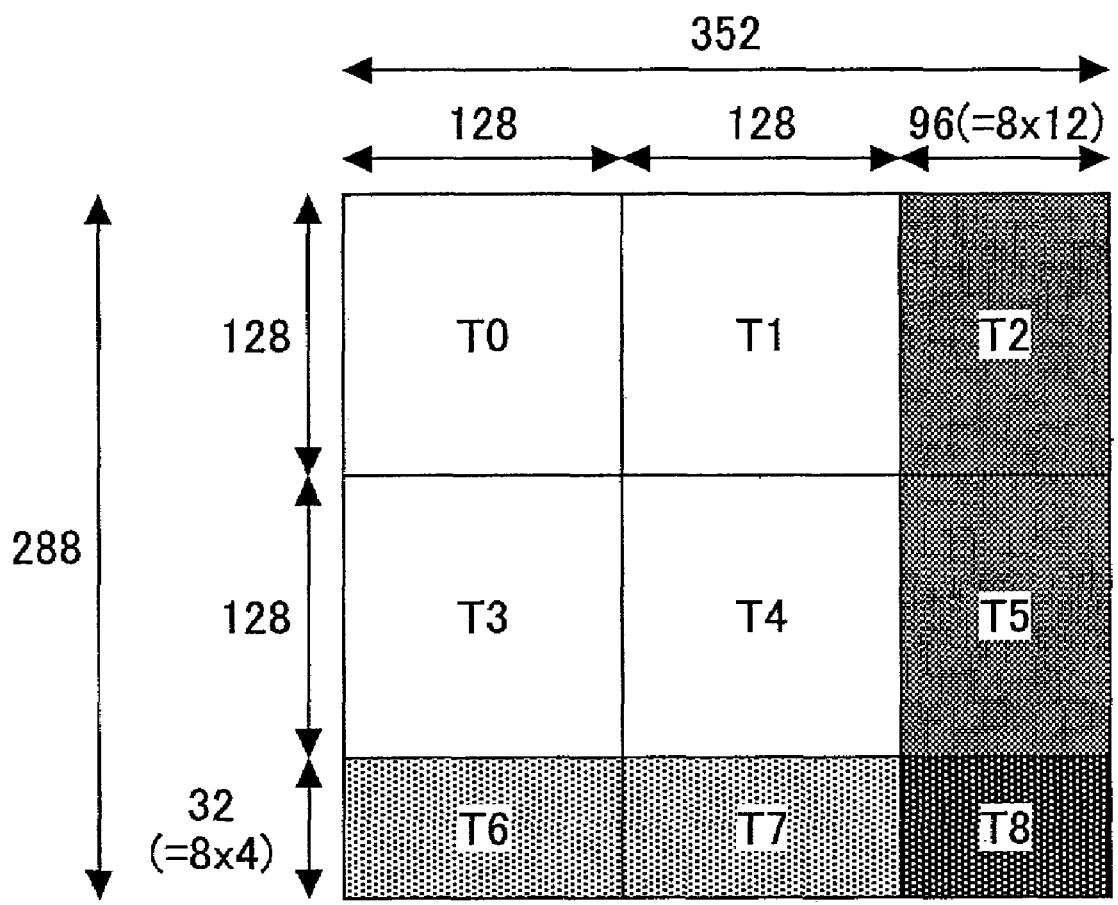
FIG. 6 is an illustrative drawing showing the way an image having a size of 352×288 is divided by the image coding apparatus of the present invention.

FIG. 6 is an illustrative drawing showing the way an image having a size of 352×288 is divided in the image coding apparatus 10 of the present invention.

As shown in FIG. 6, the image coding apparatus 10 of the present invention divides the image having the size of 352×288 into 9 tiles T0 through T8. The tiles T0, T1, T3, and T4 are each 128×128, and the tiles T2 and T5 are each 96×128. Further, the tiles T6 and T7 are each 128×32. The last tile T8 has a size of 96×32.

As was previously described, the orthogonal transform unit 12 and the address generation unit 21 are configured to achieve free addressing control for accessing the image memory 11 based on a size selection signal and a tile count.

With reference to FIG. 3, when the tile T0 is supplied to the image memory 11, the address generation unit 21 receives a tile count indicative of the time T0 or a size selection signal indicative of an image size of 123×128. In response to the size selection signal or the tile count, the address generation unit 21 generates successive addresses conforming to the image size of 128×128. That is, addresses are generated such that 128 pixels are read along a column in the vertical direction, and such that columns are shifted one after another until all the 128 columns are read. Thereafter, addresses are generated such that 128 pixels are read along a row in the horizontal direction, and such that rows are shifted one after another until all the 128 rows are read. The transform unit 22 applies the wavelet transform to pixel data that are retrieved from addresses generated in this manner, thereby producing data that is decomposed into lower frequency components and higher frequency components. This processing is carried out for the entire image data in the vertical direction and in the horizontal direction, so that 2-dimensional data of vertical and horizontal decomposed frequency components is obtained. Further, this processing is repeated a predetermined number of times, thereby producing an output of multi-resolution image of predetermined octaves.

Thereafter, the tile T1 is supplied to the image memory 11. In conjunction with this, the address generation unit 21 receives a size selection signal indicative of the image size of 128×128 or a tile count indicative of the tile T1. The orthogonal transform unit 12 operates in the same manner as in the case of the tile T0. This produces an output of orthogonal transform with respect to the tile T1.

The tile T2 is then supplied to the image memory 11. In conjunction with this, the address generation unit 21 receives a size selection signal indicative of the image size of 96×128 or a tile count indicative of the tile T2, and generates successive addresses conforming to the image size of 96×128. According to the generated address, an output of orthogonal transform with respect to the tile T2 is obtained.

By the same token, the address generation unit 21 successively generates addresses matching the relevant image sizes with respect to the remaining tiles T3 through T8. In this manner, orthogonal transform coefficients for these tiles are obtained.

Figure 7:
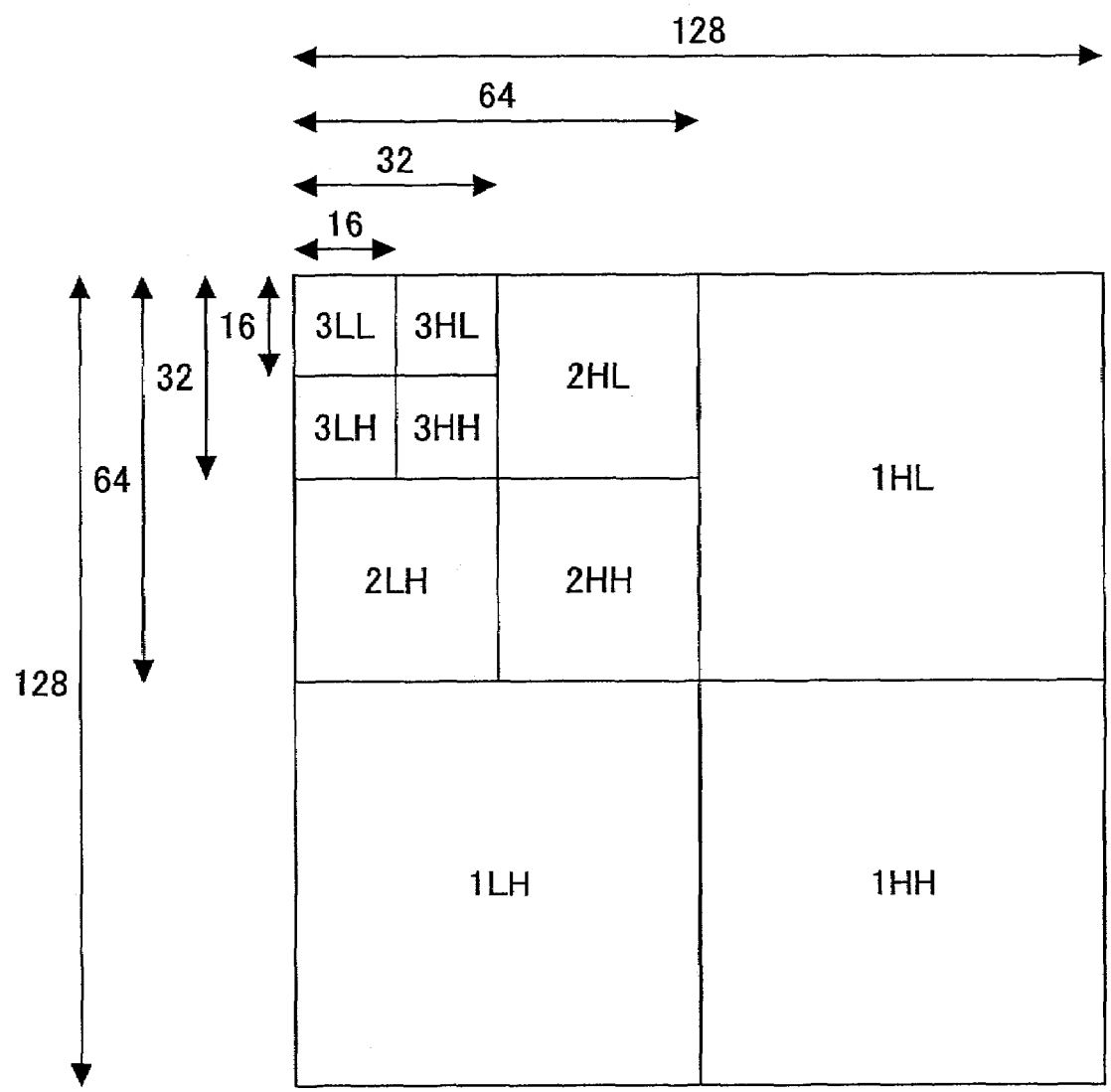
FIG. 7 is an illustrative drawing showing quantization coefficients obtained by quantizing the output of wavelet transform applied to a tile having a size of 128×128.

FIG. 7 is an illustrative drawing showing quantization coefficients obtained by quantizing the output of wavelet transform applied to a tile having a size of 128×128. As shown in FIG. 7, the quantization data is divided into 10 sub-bands of frequency components. The sizes of these sub-bands are as follows.

3LL, 3HL, 3LH, and 3HH: 16×16
2HL, 2LH, and 2HH: 32×32
1HL, 1LH, and 1HH: 64×64

The quantization coefficients as shown in FIG. 7 are coded by the entropy coding unit 14 (FIG. 3) on a sub-band-by-sub-band basis.

Figure 8:
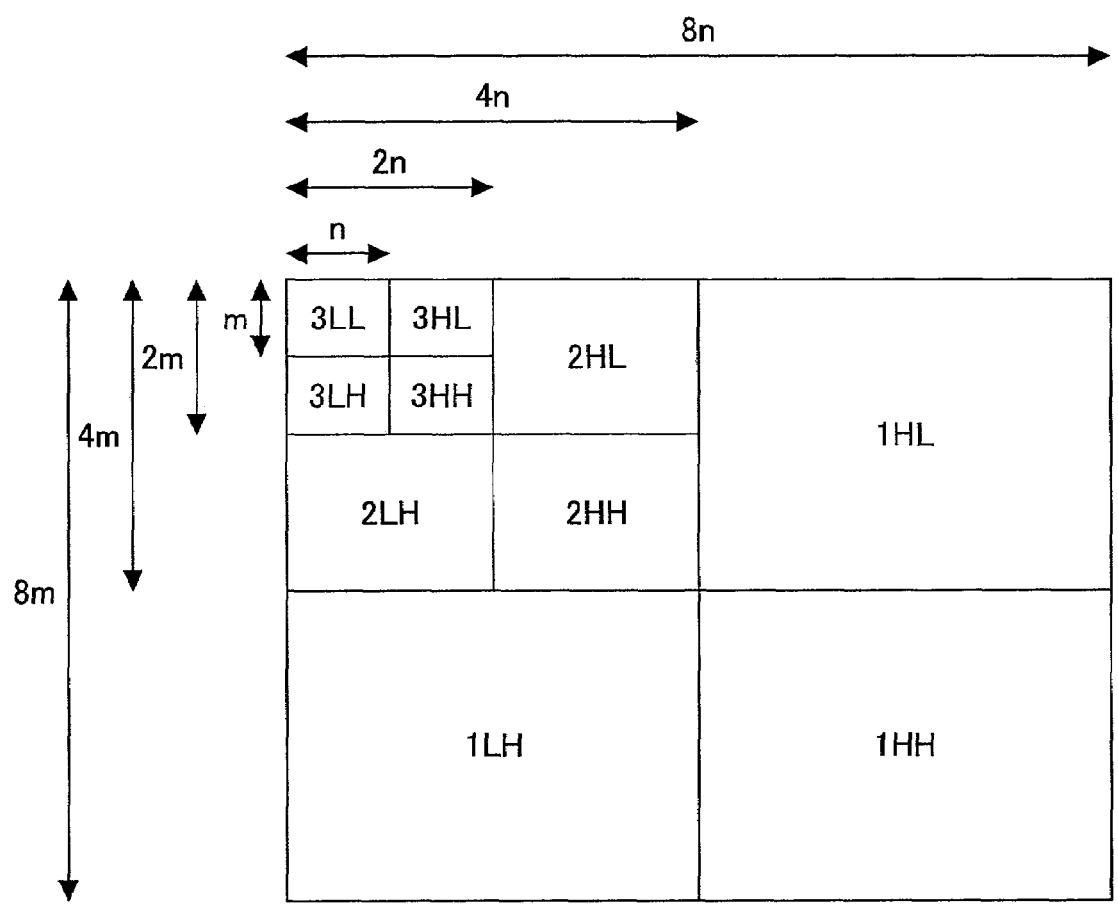
FIG. 8 is an illustrative drawing showing quantization coefficients obtained by quantizing the output of wavelet transform applied to a tile having a size of 8n×8m.

FIG. 8 is an illustrative drawing showing quantization coefficients obtained by quantizing the output of wavelet transform applied to a tile having a size of 8n×8m. As shown in FIG. 8, the quantization data is divided into 10 sub-bands of frequency components. The sizes of these sub-bands are as follows.

3LL, 3HL, 3LH, and 3HH: n×m
2HL, 2LH, and 2HH: 2n×2m
1HL, 1LH, and 1HH: 4n×4m

Since the tile T2 of FIG. 6 has a size of 96×128, n is 12 and m is 16. For the tile T6 having a size of 128×32, n is 16 and m is 4. For the tile T8 having a size of 96×32, n is 12 and m is 4. In this manner, each tile preferably has a size of 8n×8m that is a multiple of 8 in each side so that a multi-resolution analysis of 8 octaves, for example, is possible.

In the image coding apparatus 10 according to the present invention, when the size of an original image is different from a multiple of 128×128, there are reminder tiles after dividing the original image into tiles each having the size of 128×128. In such a case, the addressing function of the address generation unit 21 is utilized to generate addresses matching the sizes of the reminder tiles, followed by orthogonal transform applied to the image data retrieved from the generated addresses. This makes it possible to perform orthogonal transform without inserting padding data, thereby improving the efficiency of orthogonal transform. Further, undue degradation of image quality can be avoided when the transformation is of an irreversible nature.

The above description has been provided with reference to an example in which the base size of orthogonal transform is 128×128, and the size of a frequently used image is 160×120. These sizes are only examples for the illustration purpose, and the image sizes subjected to orthogonal transform are not limited to any particular sizes in the present invention. Further, although the wavelet transform is used as an example of orthogonal transform, the orthogonal transform is not limited to the wavelet transform, but can be a different type of transformation such as DCT (discreet cosine transform) or the Fourier transform.

The principle of the present invention is applicable to decoders as well as to encoders. Provided with an image memory having a sufficient size for storing an image of a frequently used size and an address generation unit capable of free addressing control for memory access, a decoder will be as flexible as the encoder (i.e., coding apparatus) that has been described above. Further, the encoder and decoder of the present invention are applicable to digital copiers, digital still cameras, digital video cameras, or the like.

Further, the present invention is not limited to these embodiments, but various variations and modifications may be made without departing from the scope of the present invention.

The present application is based on Japanese priority application No. 2001-146864 filed on May 16, 2002, with the Japanese Patent Office, the entire contents of which are hereby incorporated by reference.

What is claimed is:

1. An image processing apparatus, comprising:
a wavelet transform unit which applies filtering to each of one or more images having a first size into which an original image is divided, thereby producing wavelet coefficients;

a quantization unit which scans and quantizes the wavelet coefficients to produce quantization coefficients; and a coding unit which scans and encodes the quantization coefficients, wherein a number of pixels in one line for said filtering and a number of pixels in one line scanned for the quantization and the encoding are selectively changed, thereby encoding an image having a second size relatively small and of frequent use without division thereof into the one or more images having the first size.

2. The image processing apparatus as claimed in claim 1, wherein the number of pixels in one line for said filtering and the number of pixels in one line scanned for the quantization and the encoding are changed so as to process an image having a third size whose horizontal and vertical lengths are a multiple of $2^n$ (n: positive integer) corresponding to a maximum level of a multi-resolution analysis of said wavelet transform, whereby divided portions of the original image having the first size and fully included in the original image are processed as the one or more images having the first size, and at least one remaining portion of the original image is processed as an image having the third size.

3. An image processing apparatus, comprising:

an image memory of a first size;

an address generation unit which receives information indicative of an image size, and generates addresses for accessing said image memory according to the information; and a transform unit which performs orthogonal transform on an image retrieved from said image memory at the addresses generated by said address generation unit, wherein said address generation unit generates addresses for accessing a memory area having the first size if said image memory stores therein an image having a first size, and generates addresses for accessing a memory area having a second size if said image memory stores therein an image having a second size.

4. The image processing apparatus as claimed in claim 3, further comprising:

a quantization unit which quantizes the image transformed by the orthogonal transform by said transform unit; and a coding unit which encodes the image quantized by said quantization unit.

5. The image processing apparatus as claimed in claim 3, wherein said transform unit performs a wavelet transform as the orthogonal transform.

6. A method of processing an image, comprising the steps of:

providing an address generation unit which receives information indicative of an image size, and generates addresses for accessing an image memory according to the information;

dividing an original image into one or more sub-regions having a predetermined size and one or more remaining regions;

supplying the one or more sub-regions having the predetermined size to the image memory, and supplying information indicative of the predetermined size to the address generation unit;

retrieving image data from the image memory by using addresses generated by the address generation unit in such a manner as to match the predetermined size, and performing orthogonal transform on the retrieved image data;

supplying the one or more remaining regions to the image memory, and supplying information indicative of size of the one or more remaining regions to the address generation unit; and retrieving image data from the image memory by using addresses generated by the address generation unit in such a manner as to match the size of the one or more remaining regions, and performing orthogonal transform on the retrieved image data.

7. The method as claimed in claim 6, further comprising the steps of:

quantizing the one or more sub-regions and the one or more remaining regions after the orthogonal transform; and encoding the one or more sub-regions and the one or more remaining regions after the quantization.

8. The method as claimed in claim 6, wherein the orthogonal transform is a wavelet transform.

9. The method as claimed in claim 8, further comprising the steps of:

setting the one or more sub-regions having the predetermined size such that each of the one or more sub-regions has vertical and horizontal lengths that are $2^n$ (n: positive integer) pixels; and setting the one or more sub-regions having the predetermined size such that each of the one or more sub-regions has vertical and horizontal lengths that are a multiple of $2^m$ (m: positive integer) pixels.

* * * * *